US008433931B2

(12) United States Patent
Burg et al.

(10) Patent No.: US 8,433,931 B2
(45) Date of Patent: Apr. 30, 2013

(54) INTEGRATING ENERGY BUDGETS FOR POWER MANAGEMENT

(75) Inventors: David Burg, Bellevue, WA (US); Nathan Steven Obr, Bellevue, WA (US); Vladimir Sadovsky, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 505 days.

(21) Appl. No.: 12/465,362

(22) Filed: May 13, 2009

(65) Prior Publication Data

US 2010/0292854 A1 Nov. 18, 2010

(51) Int. Cl.
*G06F 1/26* (2006.01)
(52) U.S. Cl.
USPC .......................................... 713/300; 713/330
(58) Field of Classification Search ............ 710/15, 710/16; 713/300, 320, 322, 330
See application file for complete search history.

(56) References Cited

U.S. PATENT DOCUMENTS

| | | | | |
|---|---|---|---|---|
| 6,633,932 B1 * | 10/2003 | Bork et al. | | 710/72 |
| 6,785,592 B1 | 8/2004 | Smith et al. | | |
| 7,281,146 B2 * | 10/2007 | Nalawadi et al. | | 713/320 |
| 8,020,009 B2 * | 9/2011 | Wertheimer | | 713/300 |
| 2007/0050647 A1 | 3/2007 | Conroy et al. | | |
| 2007/0203860 A1 | 8/2007 | Golden et al. | | |
| 2007/0245161 A1 | 10/2007 | Shaw et al. | | |
| 2007/0300083 A1 | 12/2007 | Goodrum et al. | | |
| 2008/0178018 A1 | 7/2008 | McGrane et al. | | |

OTHER PUBLICATIONS

"Dynamic Power Management for Embedded Systems", Retrieved at <<http://www.research.ibm.com/arl/publications/papers/DPM_V1.1.pdf>>, IBM and MontaVista Software, Version 1.1, Nov. 19, 2002, pp. 1-25.
McGrane, Sean, "A Dynamic Approach to Power Budgeting", Retrieved at <<http://www.intelalliance.com/microsoft/assets/node-mgr-story-extracted8-12.pdf>>, Issue No. 15, 2008, pp. 16-21.
Bianchini, et al., "Power and Energy Management for Server Systems", Retrieved at <<http://www.cs.rutgers.edu/~ricardob/papers/computer04.pdf>>, pp. 1-11.
"Designing Power-Friendly Devices", Retrieved at <<http://download.intel.com/technology/EEP/designing_power_friendly_devices.pdf>>, 2007, pp. 1-18.

* cited by examiner

*Primary Examiner* — Glenn A Auve
(74) *Attorney, Agent, or Firm* — Microsoft Corporation

(57) ABSTRACT

Power consumption of a device (e.g., flash storage driver, hard drive, etc.) connected to a host computer system is managed to promote efficient power usage and improved service. Communication between a host computer system (e.g., an operating system) and a device is enabled so that the host system can ascertain a power footprint of the device. Taking the power footprint of the device into consideration, along with the power consumption of the system as a whole (e.g., including the power consumption needs of other devices), a power manager can provide a power budget to the device based upon an informed decision. This allows for improved system power management through a coordination of the device's power consumption by the host system, specifically during operation allowing device performance to be enhanced for the task at hand.

20 Claims, 8 Drawing Sheets

INTEGRATING ENERGY BUDGETS FOR POWER MANAGEMENT

BACKGROUND

A typical computer can be comprised of a many different hardware and software components. A particular software component, called an operating system, acts an interface between a computer's user and the computer's hardware components. As an interface, the operating system is generally responsible for coordinating and manipulating the computer's hardware components to perform an operation requested by the user. The operating system achieves these goals by using communication protocols which allow for interaction between a computer's software (e.g., the operating system) and hardware components. Communication protocols allow the operating system to provide operating instructions to the hardware such as when to turn on, when to turn off, at what speed to operate, etc.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, a technique for managing the power consumption of a device (e.g., flash memory storage drive, SATA solid state disk, hard drive, etc.) connected to a host computer system (host system) is disclosed. The method provides for a communication protocol, providing interaction between the host computer system (e.g., a software operating system) and the device (e.g., a hardware device), which allows the host system to ascertain the power footprint (e.g., the power consumption of the device and/or the power policies governing the internal device operations) of the device. Taking the power footprint of the device into consideration, along with the power consumption of the system as a whole (e.g., including the power footprint of other devices), a power manager can provide a power budget (e.g., energy allotment, power policy) to the device through an informed decision based upon reported power footprints and/or requirements. This allows for improved system power management through a coordination of the device's power consumption by the host system.

More particularly, a host computer system (host system) queries a device through a communication protocol to ascertain the device's identity (e.g., a flash drive, SATA solid state disk, CD-ROM drive, etc.). The host system receives the device's identity and obtains information regarding the identified device's power footprint (e.g., power consumption, power profile). The information regarding the identified device's power footprint can be utilized by the power manager, in conjunction with algorithms configured to determine an overall power consumption of the host system, to make a decision as to a power budget comprising an allotment of power the identified device may operate with (e.g., host system determines how much of a system's power can be allocated to the device's operation) and/or a power profile that governs the device's internal operations. In determining the power budget, the power manager may take into consideration parameters such as the power supply available, the power load of other devices, etc. The power budget is returned to the device through the communication protocol, thereby forming a power management system in which communication between devices and their host systems (e.g., operating systems) allow for an intelligently designed power consumption based upon an informed decision. Providing for an intelligently designed power management system allows a host system to reduce its power consumption while providing improved service (e.g., during operation it allows a specific device's performance to be enhanced for the task at hand).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
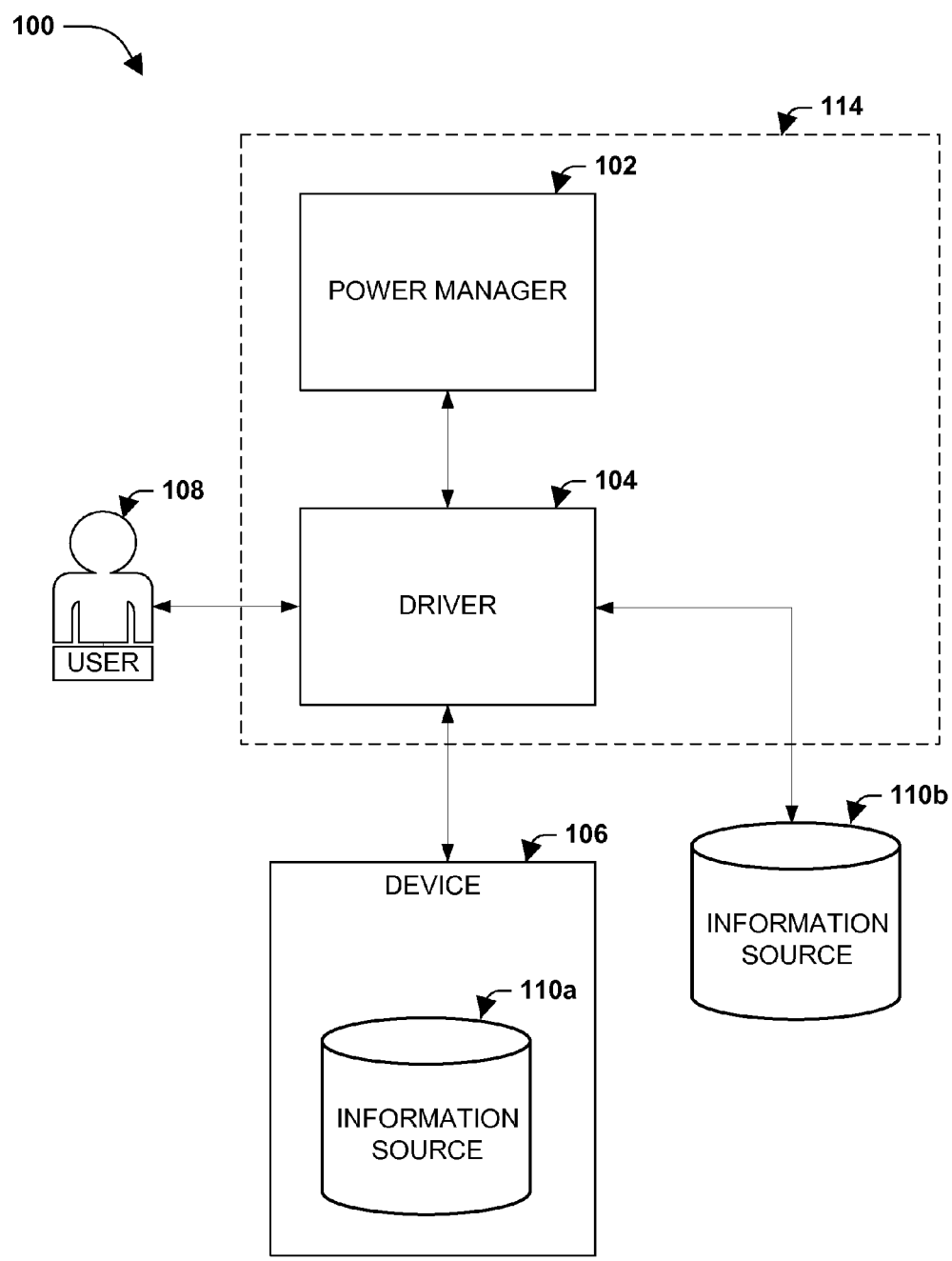
FIG. 1 illustrates a block diagram illustrating an exemplary host system configured to integrate energy budgets for devices.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and components are illustrated in block diagram or flow diagram form in order to facilitate describing the claimed subject matter.

In recent years the integrated chip industry has made enormous strides in increasing the performance of integrated chips while reducing their size and power consumption. These improvements have lead to high performance computers, high powered servers, and sophisticated storage devices. However, this increased functionality often requires more sophisticated power management to prevent a drain on the power supply of a system which limits the operation of the system (e.g., reduces operation time, reduces performance, etc.). For example, sophisticated storage devices push the envelope for performance, reliability, and capacity. However, in order to make these gains the storage devices often have to compensate with sophisticated internal processes that use power. Accordingly, a power management system is described herein which offers an improvement in device power consumption management.

Among other things, a technique for managing the power consumption of a device (e.g., flash storage drive, SATA solid state disk, hard drive, etc.) connected to a host computer system (host system) is disclosed. The method and corresponding structure provide for a communication protocol, providing interaction between the host computer system (e.g., a software operating system) and the device (e.g., a hardware device), which allows the host system to ascertain the power footprint (e.g., the power consumption and requirements of the device for specific operations and/or the power policy governing internal device power policies). Taking the power footprint of the device into consideration, along with the power consumption of the system as a whole (e.g., including the power footprint of other devices), a power manager can provide a power budget (e.g., energy allotment, power policy) to the device through an informed decision based upon reported power footprints and/or requirements. This allows for improved system power management through a coordination of the device's power consumption by the host system.

More particularly, a host computer system (host system) queries a device through a communication protocol to ascertain the device's identity (e.g., a flash drive, SATA solid state disk, CD-ROM drive, device vendor, device model, firmware revision, etc.). The host system receives the device's identity and obtains information regarding the identified device's power footprint (e.g., power consumption, power profile). The information regarding the identified device's power footprint can be utilized by the power manager, in conjunction with algorithms configured to determine an overall power consumption of the host system, to make a decision as to a power budget comprising an allotment of power the identified device may operate with (e.g., host system determines how much of a system's power can be allocated to the device's operation) and/or a power profile to govern the device's internal operations. In determining the power budget, the power manager may take into consideration parameters such as the power supply available, the power load of other devices, etc. The power budget is returned to the device through the communication protocol, thereby forming a power management system in which communication between devices and their host systems (e.g., operating systems) allow for an intelligently designed power consumption based upon an informed decision. Providing for an intelligently designed power management system allows a host system to reduce its power consumption while providing improved service (e.g., during operation it allows a specific device's performance to be enhanced for the task at hand).

FIG. 1 illustrates a block diagram 100 of an exemplary host system 114 configured to integrate power budgets for attached devices. As shown in the example of FIG. 1, three components may be involved in the management of the power budget for host system: a power manager 102, a driver 104, and a device 106.

The power manager 102 comprises the part of the host system that contains algorithms for determining how much power the host system 114, as a whole, is going to use. As described above, the power manager 102 may be configured to receive a power footprint (e.g., power consumption, power policy) through a communication protocol (e.g., provided by the driver 104) between the device 106 and the power manager 102. The power manager 102 utilizes the received power footprint to determine a power budget (e.g., energy allotment, power policy) for the device 106. The power manager 102 may comprise an operating system which provides an interface between a host system's user 108 and the host system's hardware (e.g., device 106), for example.

The driver 104 may be broadly defined to comprise layers between a host system's software (e.g., power manager 102) and hardware (e.g., device 106). The driver 104 provides for a communication protocol that allows for the power manager 102 to communicate with the device 106, monitors a user's usage, etc. The communication protocol also allows the driver 104 to obtain usage patterns or power footprints. The power footprint of a device 106 can be read in from an information source 110. It will be appreciated that the information source 110 can come from any one or more of a number of places, either internal 110a or external 110b to the device 106, or both. For example, the information may come internally from an original equipment manufacturer (OEM) (e.g., be embedded within a flash drive itself), read in from an external database accessible, for example, via a network, provided internally and/or externally via updates to an operating system, obtained dynamically from the device itself, etc. That is, the information source may be local to 110a (e.g., stored upon) the device 106 (where this internal source may itself be periodically updated (e.g., via an external source)) and/or from a source external to 110b the device 106, or both.

The structure of FIG. 1 allows for communication between the host system 114 and the device 106 that provides the power manager 102 with a power footprint that can be used to make informed decisions about a power budget of a device. This can facilitate a particular power consumption by allowing a device to perform within the power budget thereby forming a system wherein the actions of the host system and attached devices are conformed to the available power supply, allowing a system to operate within its boundaries. This may, for example, allow a host system to provide a power budget so that one or more operations can be performed on a laptop merely using the laptop's battery. For example, some operations could be suspended so that a file could be successfully copied before the remaining charge on the laptop battery is completely consumed.

For example, by providing a power budget comprising an energy allotment (e.g., a specific amount of energy by which to operate) to a device, the device may conform its operation to the allotment by reduce its operating power by performing an operation at a slower speed. In this way the power manager can control the overall system power consumption by setting a particular energy allotment for respective devices to operate.

Similarly, by providing a power budget comprising a power policy (e.g., increasing or reducing the possible operations the device may perform to those operations that conform to the set power budget), the power manager can directly control the device's power consumption by controlling its internal operations in real time. For example, based upon the available power, a power manager can allow a device to operate according to a policy (e.g., that the system is idle) within the allotted power amount that is sufficient to perform an operation according to the policy.

It will be appreciated that these concepts may be expanded upon while comprising the idea of device control by an informed power manager. For example, a power manager may receive a request issued from a device to make changes in the internal power policy being used by the device. The power manager can either allow or deny the requested change based upon the received power footprints.

Device power budgets may also allow for a more accurate prediction of the remaining battery time, for example (e.g., by eliminating some of the guesswork and instead knowing more precisely the actual power consumption). This remaining battery time can be displayed to the user to provide an accurate representation of remaining power and allow for assessments of whether or not an operation can be completed.

It will be appreciated that a power manager can also dynamically account for variations in the device's power footprint. For example, information can be obtained dynamically to account for changes in a device's power footprint over time (e.g., a device's power footprint may change depending on what actions the device is taking). For example, a CD-ROM drive will have a different power footprint if it is idle, if it is reading a CD, if it is burning a CD at a first speed, or if it is burning a CD at a second speed, etc. During the course of a user's operation, the CD may change operations multiple times requiring different amounts of energy. Obtaining information by employing a dynamic monitoring method allows for the power footprint of a device to be managed in real time.

Figure 2:
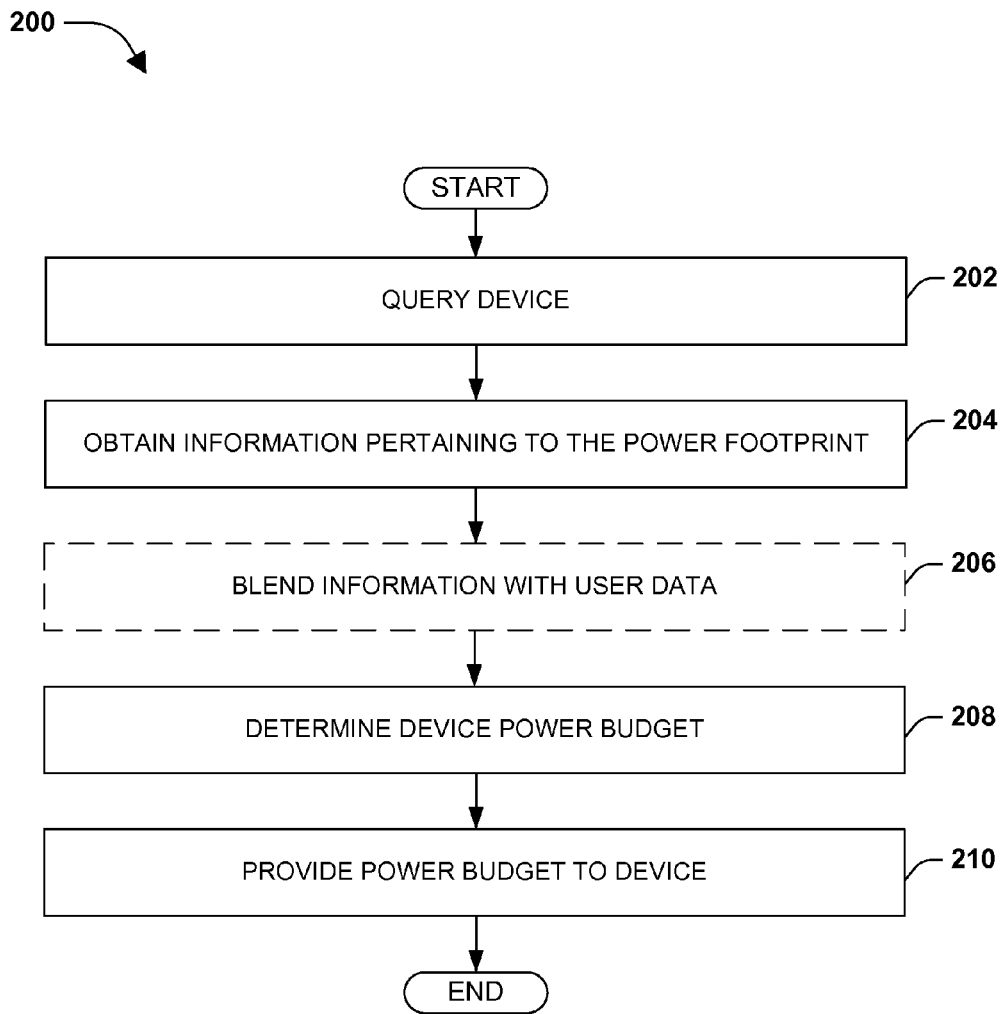
FIG. 2 illustrates a flow diagram of an exemplary method for managing power consumption of a device connected to a host computer system.

FIG. 2 illustrates an exemplary method 200 for integrating a power budget of one or more devices into the power management of a host system. More particularly, method 200 relates to a method by which a host system queries a device through a communication protocol to ascertain the devices identity (e.g., a flash drive, CD ROM drive, device vendor, device model, firmware revision, etc.). The host system receives the device's identity and obtains information regarding the identified device's power footprint that can be utilized by the power manager, in conjunction with algorithms configured to determine the overall power consumption of the host system, to make a decision as to a power budget that can be assigned to the identified device.

At 202 a power manager queries the device. The query will be communicated to the device (through a driver) via a communication protocol which makes it possible for the identity of the device to be provided to the power manager. The identity of the device allows the host system to recognize the device for subsequent processes. It will be appreciated that the term device, as used herein, may refer to various devices which are internally or externally coupled to the host system and which can be communicated with via a communication protocol, which makes it possible for the host system and the device to have a conversation. For example, the device may be comprised within the computer or attached to the host system via a system bus, storage bus and/or device bus through an interface such as a universal serial bus (USB) interface, a serial advanced technology attachment (SATA) interface, a peripheral component interconnect (PCI) interface (e.g., Non-Volatile Memory Host Controller Interface (NVMHCI) controllers), etc. More particularly the device may comprise a hard drive, a tape drive, a flash drive, SATA solid state disk, a monitor, etc. The device may also comprise an intelligent device that is able to make decisions about its power footprint. It will be appreciated that the power management system provided herein can be transparent regardless of what the device is, thereby allowing it to operate with various devices.

It will also be appreciated that the power manager may also query more than one device. Additionally, in the case of multiple devices, identification of the devices allows the power manager to treat the devices differently, thereby providing individualized (and/or collective) power budget to respective devices.

Information pertaining to the power footprint (e.g., power consumption or power policies of the device) is obtained at 204. The information may be obtained via the communication protocol. The information pertaining to power footprint may comprise such information on how much power is being consumed, what power policies are being run by the device, what the device is capable of, what is the power budget for respective capabilities of the device, how much power it will cost to move power states, how long a device must use a power policy before there is a net power benefit, etc. The information can be obtained from one or more of a plurality of information sources depending on the capabilities of the device. If the device is intelligent enough to talk to the communication protocol a dynamic method can be used to dynamically track the device's power footprint. Alternatively, a device's power footprint may be obtained from a device specification provided by an original equipment manufacturer (OEM), from a profile configuration file sent out during updates of an operating system (e.g., provided by empirical testing performed in a lab), from an online database, etc.

It will be appreciated that a device's power footprint may be obtained from multiple information sources. For example, the power footprint of a device can change over time (e.g., the power consumption of a device performing one operation may be different than the power consumption of the device performing another operation, a device may become less efficient and consume more power over time as it and/or parts thereof wear). To account for this change a device's power footprint may be initially provided in a non-dynamic way (e.g., by OEM specifications). The information may be later updated based upon information from different sources such as from dynamically monitoring the device's power footprint. This allows for adjustments to be made to the power manager while the device is in the field.

At 206 user data may be blended with the power footprint of a device. The host system (e.g., driver) may be configured to monitor a user's usage patterns (e.g., hardware usage pattern, power consumption patterns), a subsystem's usage pattern (e.g., flash drive usage pattern, CD-ROM usage pattern, ancillary internal memory usage pattern, etc.), and/or a device's usage pattern and aggregate the monitored information into a profile. The information contained in the profile can be correlated with the power footprint of a device to predict a future power footprint of the device. For example, as the power manager gathers information about a user, or knows specifically what the user is trying to do, the power manager can take that information into account and change the device's usage based on an upcoming operations deduced from the user's usage pattern.

A power budget is determined at 208. The power budget may comprise an energy allotment and/or a power policy, wherein the energy allotment provides an energy amount for device operation and the power policy governs a device's internal operations. The power budget may be determined by the power manager, by employing the power footprint in conjunction with algorithms configured to determine an overall power consumption of the host system. It will be appreciated that the overall power consumption may take into account other devices and may vary depending on operations the user performs with respective devices. For example, in a system comprising a CD-ROM drive and a flash drive, the CD-ROM drive may receive a larger than normal energy allotment (and the flash drive a smaller than normal energy allotment) when the CD-ROM drive is in use.

The computed power budget is provided to the identified device at 210. The power budget may be provided to the device via the communication protocol. The device may proceed to operate according to the provided power budget until another power budget is received from the power manager.

The power consumption information collected by the method of FIG. 2 can also allow the power management system to take into consideration the residency of a device (e.g., the power cost of moving a device from one power budget to another). The power management system can weigh the benefit of switching the power budget (e.g., how much power can be saved by switching) against how much power it will take to perform the switch. In one example, the power cost of moving a device from one power budget to another may be large enough to make it necessary for the device to stay at that power budget for a certain amount of time before a net power benefit is achieved, and the device can be moved to another power budget. These considerations can effect whether or not a switch in power budget is performed.

Figure 3:
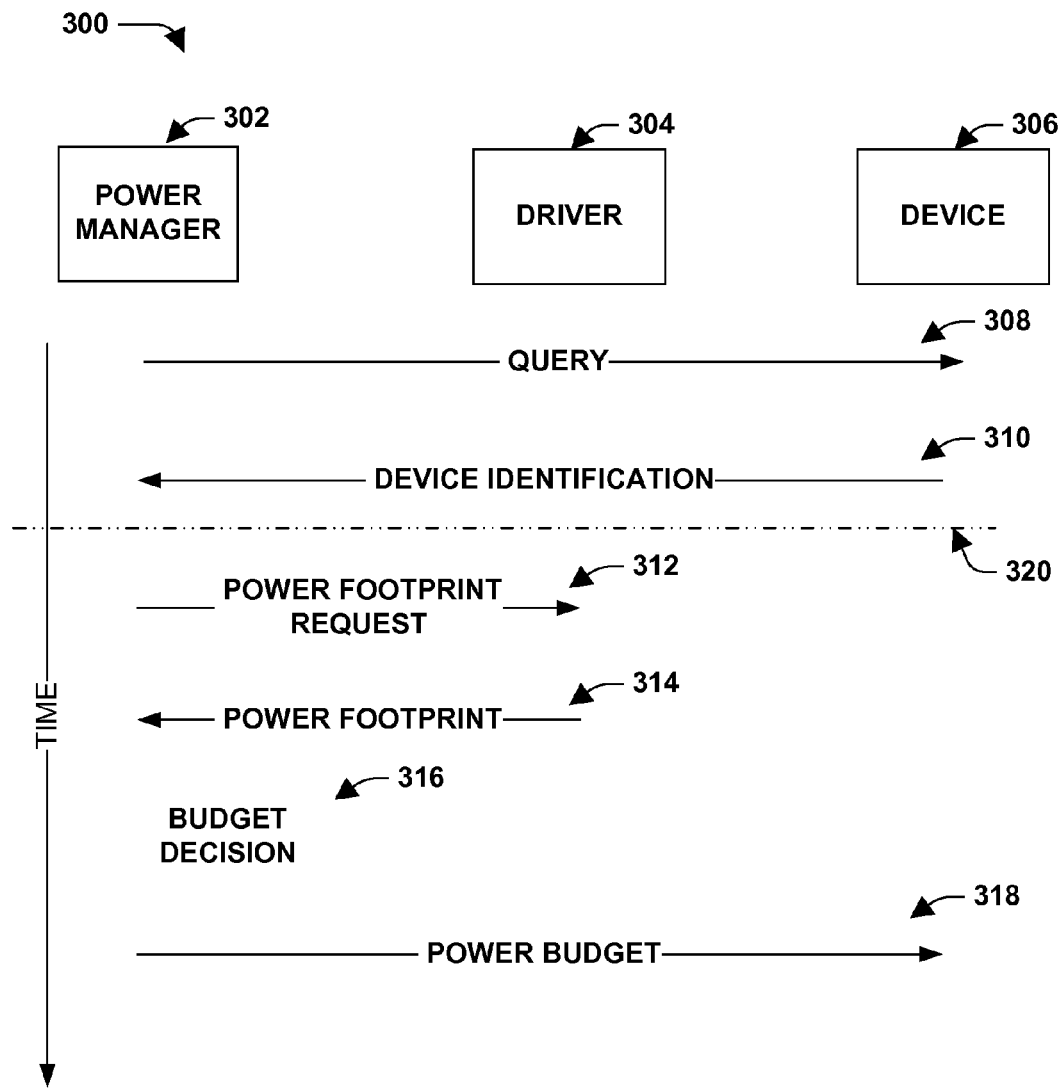
FIG. 3 illustrates exemplary communication diagram showing a transfer of data as provided herein.

FIG. 3 illustrates an exemplary communication diagram according to the method of FIG. 2 showing the transfer of data as provided herein, wherein communications between a power manager and device are enable by a communication protocol provided by the driver.

The communication diagram 300 starts with the power manager 302 sending a query 308, by way of a communication protocol, provided by the driver 304, to the device at 306. In one example, the query may be issued when power is provided to a host system. In another example, the query may be issued when a new device is added to the system (e.g., when a device is attached to a USB port of a host computer). In yet another example, the query may be issued at other times throughout operation of the system. That is, it is to be appreciated that such a query may be issued at any time.

The device 306 communicates the device's identity back to the power manager 302 through the communication protocol at 310.

The power manager 302 then requests a device's power footprint at 312. The driver 304 will obtain the power footprint and return it to the power manager 302 at 314. As illustrated in FIG. 3, the power footprint is obtained by the driver 304. It will be appreciated that the driver may read the power footprint from different sources, for example, using the same communication protocol to read the footprint from the device itself and/or using a separate communication protocol to read the power footprint from an information source external to the host system.

Once a power footprint is received by the power manager 302, at 316 the power manager 302 makes a decision as to the power budget of device 306 relying upon algorithms configured to determine an overall power consumption of the host system. Once the power budget of the device is determined a power budget may be communicated to the device at 318.

If the power footprint of the device is dynamically monitored, the communications below line 320 (e.g., actions 312-318) can be cyclically repeated to provide a dynamically updated power budget for the device 306.

Furthermore, the host system may be configured to provide not only provide the needed energy to complete the operation, but may also provide alternative energy options to cleanly suspend or to cleanly cancel an operation (e.g., as opposed to a surprise interrupt by loss of power).

As illustrated in Table 1, a host system running on a limited power supply (e.g., a battery) can utilize a received power footprint from a device to determine if the host system has sufficient power to complete an operation. As shown in Table 1, the host system will assess the power configuration of the system (e.g., how much power the system has and how much power an operation will take) and accordingly take an action. For example, as illustrated in table 1, if the host system has enough power to complete an operation the host system will proceed with the operation without interruption. However, if the host system has enough power to just suspend an operation the host system will suspend the operation. Table 1 illustrates other exemplary power configurations and host system actions. It will be appreciated that a host system may execute more than one of the below operations.

TABLE 1

| Power configuration: | Host system action: |
| --- | --- |
| Enough power for operation | Operation may proceed without interruption |
| Enough power to just suspend operation | Operation may be suspended |
| More than enough power to suspend operation | Continue operation for now, ask user to reconnect the power source within timeout period (timeout based on time available until the remaining energy will be just enough to suspend) |
| Not enough power for operation | Query devices power footprint for the suspend energy |
| Not enough energy to suspend | Query devices power footprint for energy for clean cancellation |

In a particular example, the host system can be configured to provide messages to the user in regard to the power consumption of the system. For example, for a laptop running on a battery has a limited power supply. Based upon the obtained power footprint of a device attached to the laptop, the power manager may calculate the power a device will consume to perform an operation. If the power the device will consume is greater than the laptop's power supply (e.g., battery), the system can send a message to the laptop's user alerting them that they do not have enough power to perform the operation and that unless they unless they promptly reconnect the alternative power source (e.g., a wall plug), the operation will be cancelled. If the user reconnects the alternative power source, the operation completes, otherwise the operation is cancelled when a timeout is reached.

As provided herein, the power manager may also make decisions as to when, how and/or whether a device is to operate, where this decision may take into consideration other current power demands placed on the system (e.g., by other concurrently running devices). That is, the decision as to when, how and/or whether to operate a device may also be based upon the overall power consumption of the host system. For example, when a host system has a sufficiently large power supply multiple devices may operate normally. However, if the power supply of the host system is restricted (e.g., a laptop running off of its battery), the power manager may have to restrict the operation of one or more devices.

It will be appreciated that in addition to being applicable to a single client device (e.g., a laptop), the power management system provided herein may also be integrated into a host computer system comprising multiple components that consume power, such as a high performance server having a plurality of storage devices, for example, where the devices may be distributed in some manner (e.g., across a network). In such a system, the host computer system can be configured to aggregate information pertaining to the power consumption of respective storage devices, and make a decision as to the power budgets of the respective storage devices that allows for device operation within the system's resources. For example, if multiple storage devices are attached to a single computer, upon power-up, the computer will experience a spike in power consumption that may exceed the capability to supply power to the system, causing system failure. As provided herein, the power management system can utilize the power footprint of the storage devices to make a decision to stagger when respective storage devices are powered-up, thereby preventing the system from overextending itself. Similarly, the power manger can utilize the power footprint obtained from storage devices to enhance start up capabilities of a host system by taking into account power consumed by the entire system and associated devices. That is, where multiple power consuming devices act in concert, the power manager can selectively activate and/or deactivate devices. Moreover, such activation and/or deactivation can be gradual (e.g., slowly powering-up and/or powering-down a particular device to conserve energy and/or address inertial effects).

Figure 4:
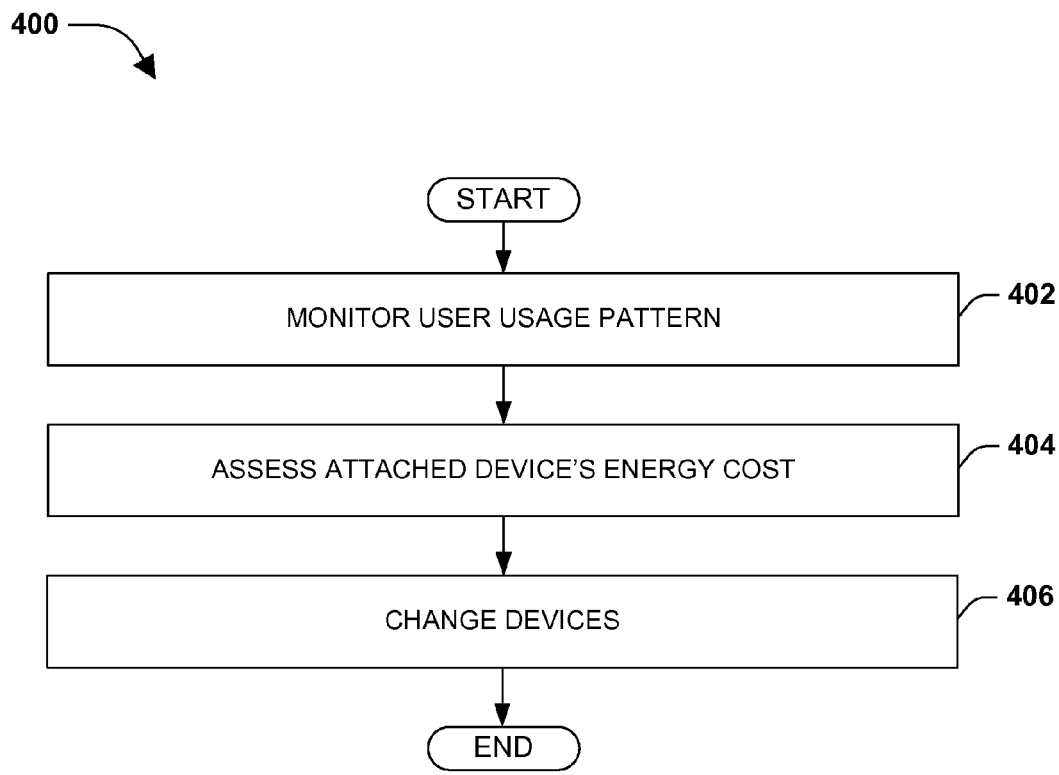
FIG. 4 illustrates a flow diagram of another example, wherein a host system utilizes a user's usage patterns to determine whether or not to operate a device.
Figure 5:
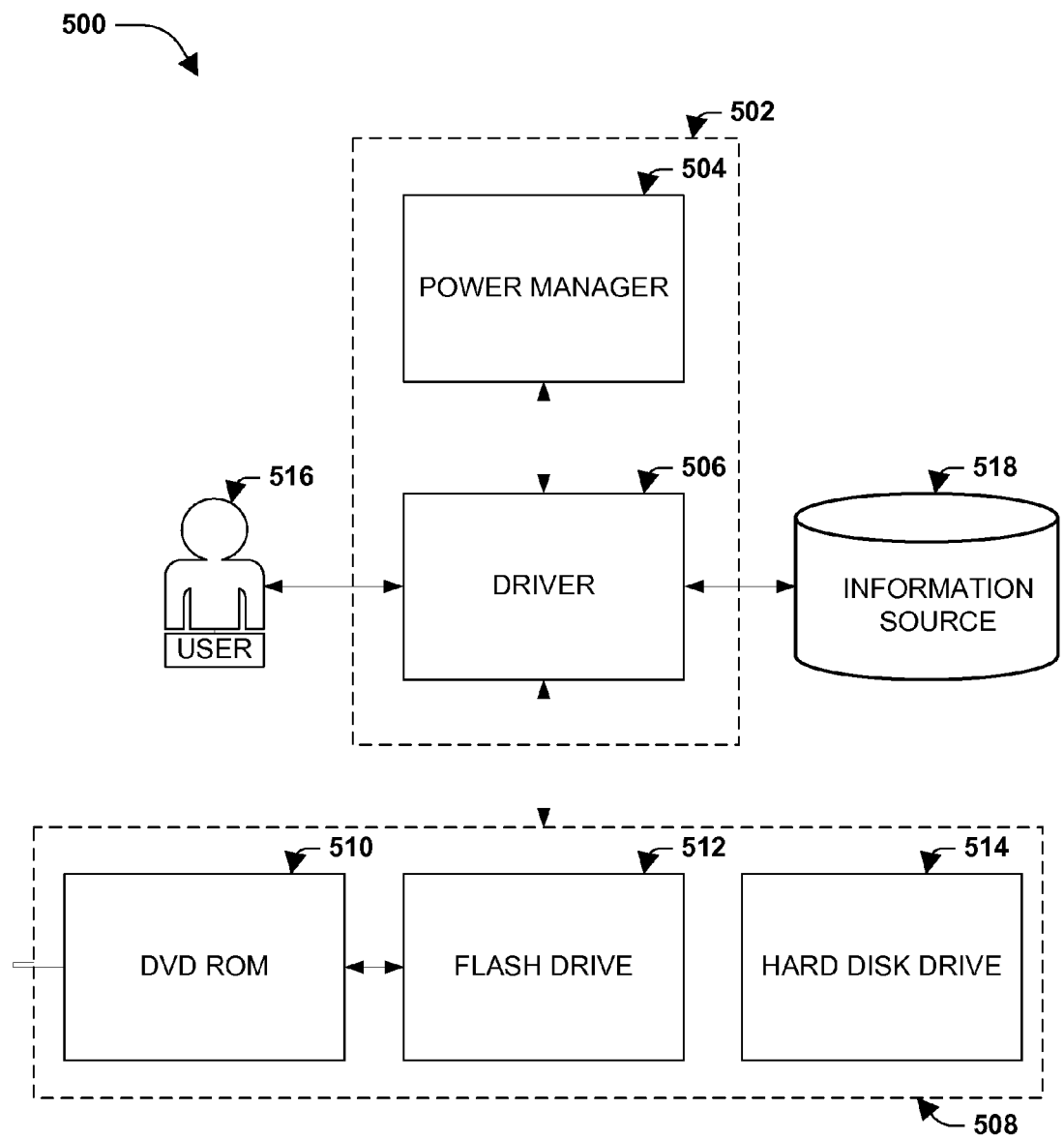
FIG. 5. Illustrates another exemplary block diagram of a host system comprising a computer, wherein a driver is coupled to three different devices, and wherein power manager moves content from one device to another device with a lower power footprint.

FIG. 4 illustrates a flow diagram of another example, wherein the host system utilizes a user's usage patterns in conjunction with power footprints to determine how to budget or whether or not to operate a device. FIG. 5 illustrates another example of a block diagram 500 of a host system comprising a computer 502, wherein a driver 506 is coupled to three different devices: a DVD ROM 510, a flash memory drive 512, and a hard disk drive 514.

At 402 the user's usage pattern is monitored. The usage pattern may be monitored by a host system's driver. As illustrated in FIG. 5, the driver 506 will communicate to respective devices 508 to determine their power footprint and will provide the power footprints to the power manager 504 via a communication protocol.

An energy cost to perform an operation by the attached devices is assessed at 404. For example, as illustrated in FIG. 5, the power footprint of the DVD ROM 510, the flash memory drive 512, and the hard disk drive 514 will be received by the power manager 504 from an information source 518. The power manager will utilize the power footprints to determine the energy cost of an attached device to perform an operation.

At 406 a device in use is changed if an alternate device is more power efficient. The power manager may use the assessed energy cost to make a decision as to which device is used to perform an operation. In a scenario where the computer 502 has a limited power supply, the power manager 504 can make a decision to move content from one device to another device with a lower power footprint. This allows a lower power device to perform operations thereby conserving the overall power consumption of the host system.

For example, if a user inserts a DVD-Video, it may be deduce from the user's usage pattern that the user is likely to play the video next. More particularly, in a DVD playback scenario, the power manager 504 can then change the DVD ROM 510 usage by not streaming the video directly from the DVD but instead copying its content to the lower power consumption flash memory drive 512 and stream the video from the flash memory drive 512 instead (e.g., assuming the content copy can be done in a short time with an overall lower energy budget, and that the longer streaming from the flash storage consume less energy), thereby allowing the user 516 to work only off of the flash memory drive 512, while still receiving the DVD ROM's information. This allows the power manager to shutdown both the DVD ROM 510 and the hard disk drive 514, so that the DVD ROM's usage is changed from a long period of activity (streaming) to a short period of intensive activity (content copy).

The user's usage pattern monitoring may involve multiple users on a same computer. The system may use login information or other algorithms such as behavioral pattern recognition to distinguish users (e.g., since respective users may have different habits). For example, one user may usually start my computer then go get a coffee while email is synchronizing, while a second user may usually go online to browse the day's news after starting a session.

Figure 6:
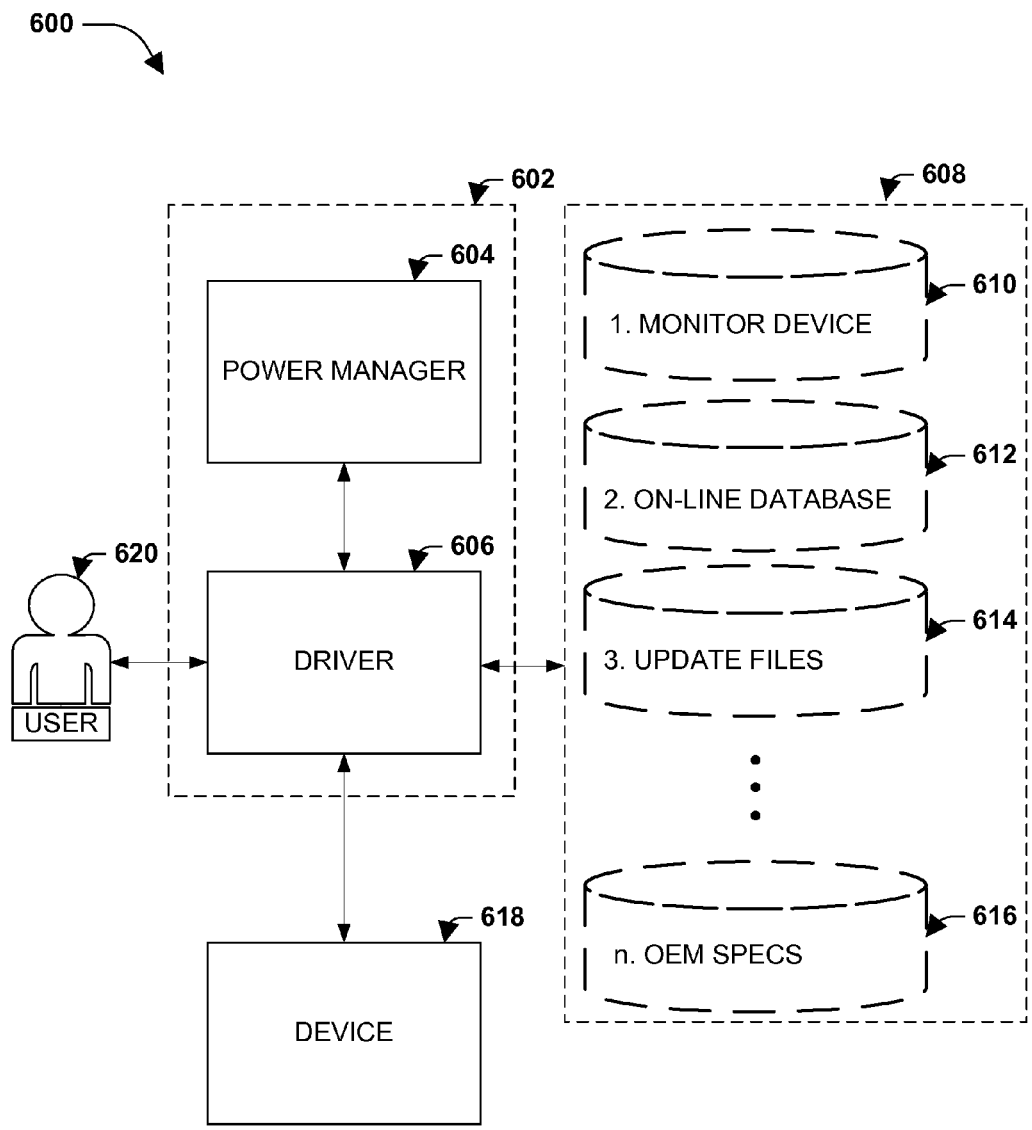
FIG. 6 illustrates another exemplary block diagram of a host system comprising a power manager configured to choose an information source of a power footprint from a hierarchy of ranked information sources.

FIG. 6 illustrates another exemplary block diagram 600 of a host system 602 comprising a power manager 604 configured to choose an information source of the power footprint from a hierarchy of ranked information sources 608, wherein a given information source cannot provide the power footprint, the power manager receives the power footprint from a lower ranked information source in the hierarchy of ranked information sources 608.

More particularly the power manager 604 may be configured to receive a power footprint through a driver from a hierarchy of ranked information sources 608. As illustrated in FIG. 6, the driver 606 will first try to read the power footprint from the highest ranked information source 610 (e.g., to monitor the device to determine the power footprint dynamically). If the driver 606 is unable to read a power footprint from the highest ranked information source 610 (e.g., since the device is not an intelligent device), the driver 606 attempts to read the next highest ranked information source 612 (e.g., to access an on-line database comprising the power footprint). In a similar manner, the driver 606 will go through the other ranked information sources (e.g., receive the power footprint through updated operating system files 614) until it is able to read a power footprint for the device. It will be appreciated that even if other sources fail to provide a power footprint, that by determining a device's identity, OEM specifications 616 may be used to determine a power footprint for an identified device, for example.

Figure 7:
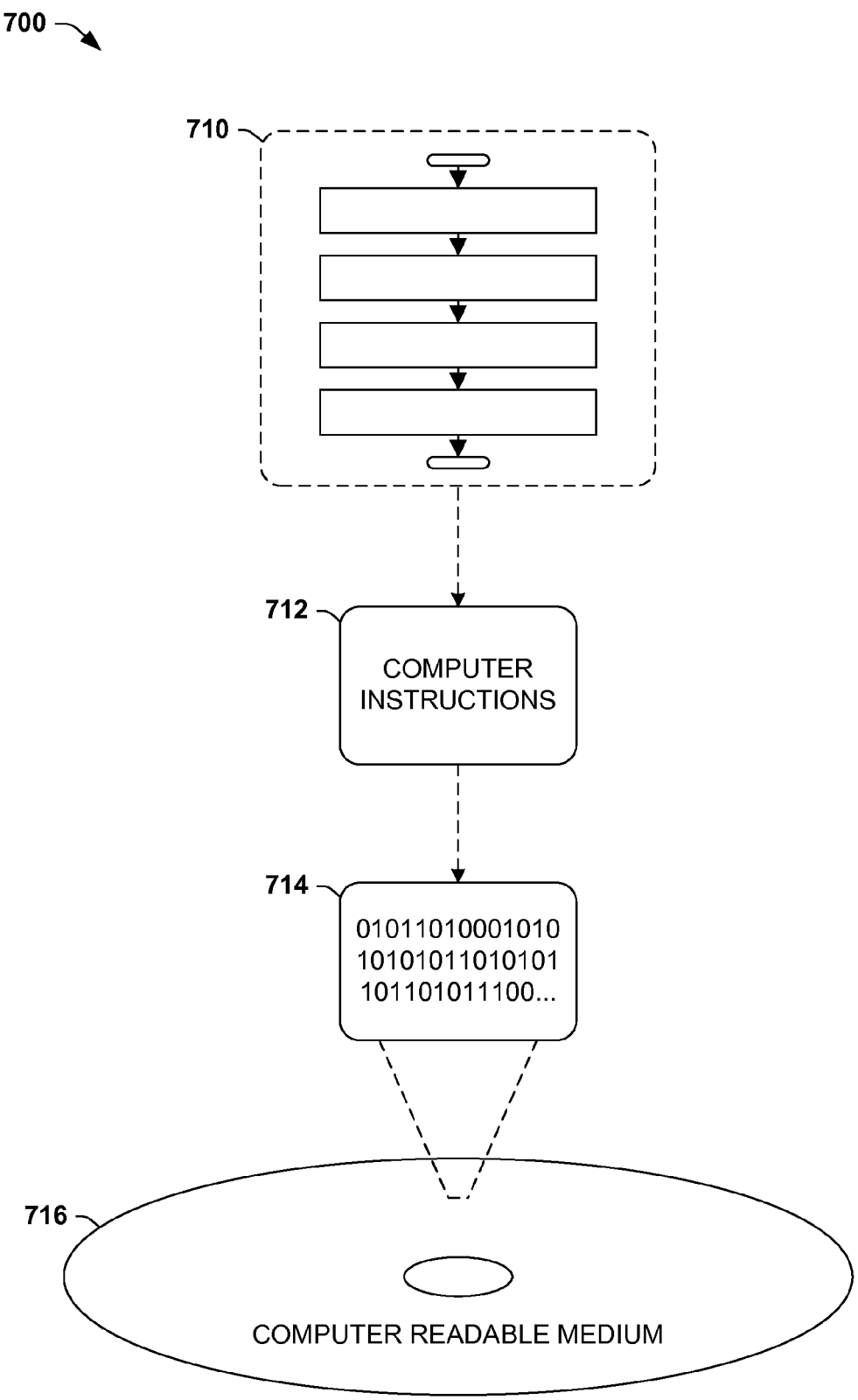
FIG. 7 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 716 (e.g., a flash solid state drive, CD-R, DVD-R, or a platter of a hard disk drive), on which is encoded computer-readable data 710. This computer-readable data 710 in turn comprises a set of computer instructions 712 (e.g., in a human recognizable form, such as programming code) configured to operate according to one or more of the principles set forth herein. In one such embodiment 700, the corresponding processor-executable instructions 714 (e.g., in computer readable form, such as binary) may be configured to perform a method, such as the exemplary method 200 of FIG. 2, for example. In another such embodiment, the processor-executable instructions 714 may be configured to implement a system, such as the exemplary system 100 of FIG. 1, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
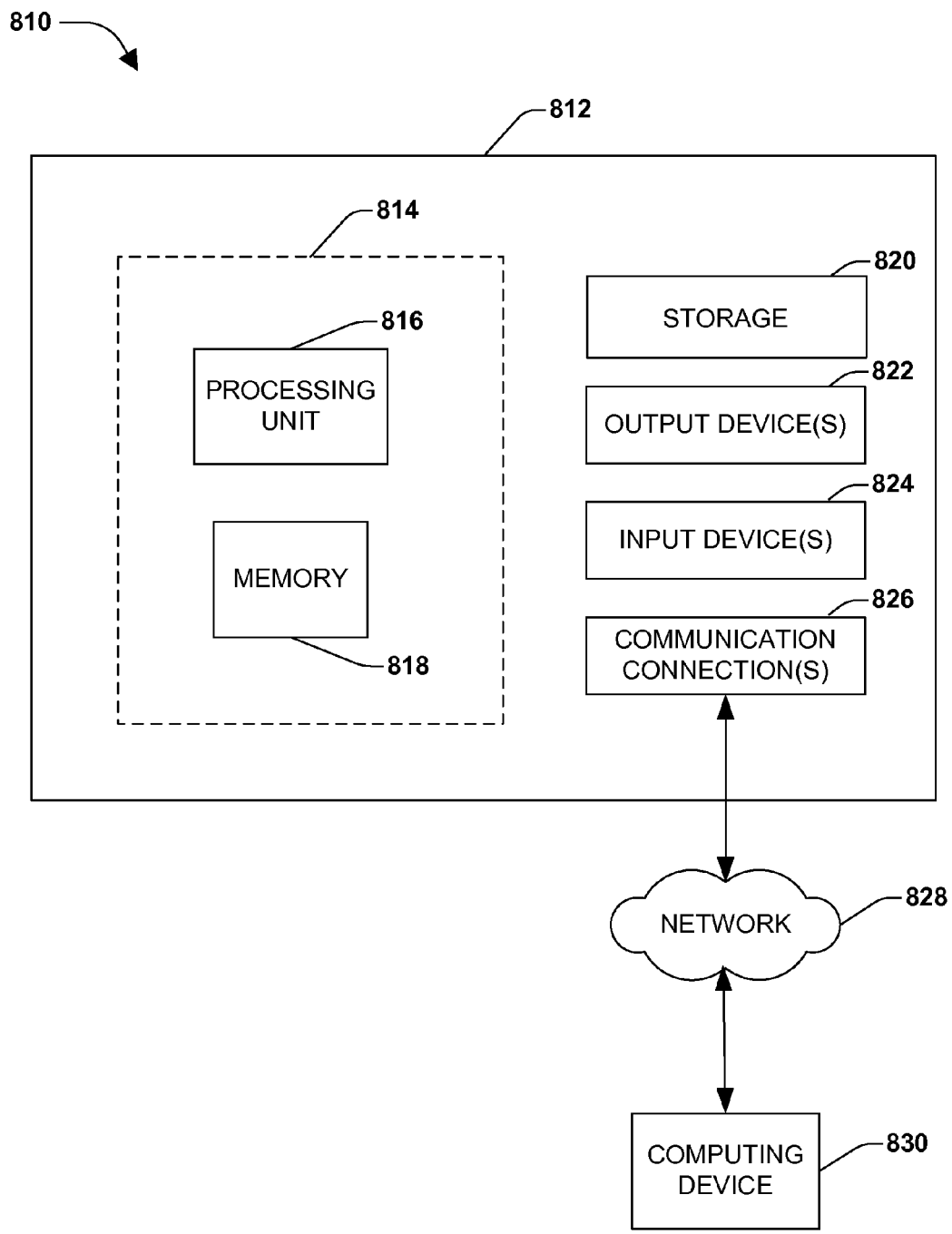
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, flash storage, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport component and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such features may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:
receiving a power footprint of a device associated with a host system, an information source of the power footprint selected from a hierarchy of ranked information sources; and
using the power footprint to determine a power budget for the device.

2. The method of claim 1, comprising:
allocating the power budget to the device, the power budget comprising a power policy governing an internal operation of the device, thereby allowing real time management of the internal operation by the power policy.

3. The method of claim 2, comprising:
receiving a request to change the power policy from the device; and
determining whether to enable the request based upon the received power footprint.

4. The method of claim 1, the power footprint comprising information pertaining to power consumption of the device and the power budget comprising an energy allotment for the device.

5. The method of claim 1, if a first information source in the hierarchy cannot provide the power footprint, the power footprint received from a lower ranked information source in the hierarchy.

6. The method of claim 1, comprising:
receiving the power footprint from an information source external to the host system.

7. The method of claim 6, the information source external to the host system comprising a device specification provided by an original equipment manufacturer.

8. The method of claim 1, comprising changing the power budget if a determination is made that power saved by the changing is greater than power expended by the changing.

9. The method of claim 1, comprising issuing a message to a host system user that communicates when the host system does not have an available power for at least one of a plurality of devices to complete an operation.

10. The method of claim 1, comprising determining the power footprint as a function of an operation attempted to be performed by the device.

11. The method of claim 1, comprising selectively deactivating one or more devices associated with the host system so that the host system can operate within an available power.

12. A host system, comprising:
a driver configured to receive a power footprint of a device associated with the host system, an information source of the power footprint selected from a hierarchy of ranked information sources, selection of the information source comprising:
if the power footprint cannot be received from a first information source in the hierarchy, receiving the power footprint from a lower ranked information source in the hierarchy.

13. The system of claim 12, comprising:
a power manager configured to use the received power footprint to determine a power budget for the device.

14. The system of claim 13, the power manager configured to:
determine a first energy cost of performing an operation with the device;
determine a second energy cost of performing the operation with a second device; and
select one of the device or the second device to perform the operation based on a comparison of the first energy cost and the second energy cost.

15. The system of claim 13, the power budget determined as a function of an operation attempted to be performed by the device.

16. The system of claim 13, configured to:
dynamically monitor the power footprint of the device; and
dynamically change the power budget of the device.

17. The system of claim 12, the driver configured to communicate with the device via at least one of a system bus, storage bus or device bus.

18. The system of claim 12, the information source comprising a profile configuration file that is received during an update of an operating system of the host system.

19. A system, comprising:
one or more processing units; and
memory comprising instructions that when executed by at least some of the one or more processing units, perform a method comprising:
using a power footprint of a device associated with a host system to determine a power budget for the device, an information source of the power footprint selected from a hierarchy of ranked information sources.

20. The system of claim 19, the information source comprising at least one of:
 a database connected to the host system; or
 an update to an operating system.

\* \* \* \* \*